(12) United States Patent
Weber et al.

(10) Patent No.: US 10,307,727 B2
(45) Date of Patent: Jun. 4, 2019

(54) METHOD FOR PROCESSING HYDROGEN CHLORIDE FROM ISOCYANATE PREPARATION

(71) Applicant: Covestro Deutschland AG, Leverkusen (DE)

(72) Inventors: Ralph Weber, Leichlingen (DE); Martin Ehrig, Leverkusen (DE); Johannes Leonhäuser, Bergisch Gladbach (DE); Dirk Weißenberg, Leverkusen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 14/722,666

(22) Filed: May 27, 2015

(65) Prior Publication Data

US 2015/0343414 A1    Dec. 3, 2015

(30) Foreign Application Priority Data

May 27, 2014 (EP) ..................................... 14170116

(51) Int. Cl.
*B01J 19/24* (2006.01)
*C01B 7/04* (2006.01)
(Continued)

(52) U.S. Cl.
CPC .............. *B01J 19/24* (2013.01); *B01D 47/14* (2013.01); *B01D 53/1406* (2013.01);
(Continued)

(58) Field of Classification Search
CPC ........ B01J 19/00; B01J 19/24; B01J 2219/24; C01B 7/00; C01B 7/01; C01B 7/04;
(Continued)

(56) References Cited

U.S. PATENT DOCUMENTS 6,890,508 B2    5/2005    Schläfer et al.
6,916,953 B2    7/2005    Walsdorff et al.
(Continued)

FOREIGN PATENT DOCUMENTS

CN          1201013 A      12/1998
CN        101151243 A       3/2008
(Continued)

*Primary Examiner* — Natasha E Young
(74) *Attorney, Agent, or Firm* — John E. Mrozinski, Jr.

(57) ABSTRACT

A method for processing hydrogen chloride from isocyanate preparation comprises the steps: a) providing hydrogen chloride; b) purifying the hydrogen chloride provided; and furthermore step c) or step d): c) bringing the purified hydrogen chloride into contact with water and/or with hydrochloric acid which is not saturated with respect to uptake of hydrogen chloride, d) further processing the purified hydrogen chloride to chlorine by partial oxidation. The hydrogen chloride provided in step a) contains organic and/or nitrogen-containing impurities and in step b) the purification is carried out by bringing hydrogen chloride into contact with hydrochloric acid which is saturated to the extent of ≥90% with respect to uptake of hydrogen chloride at least in a first gas scrubber (10) and circulating this hydrochloric acid at least partially through the first gas scrubber (10).

5 Claims, 4 Drawing Sheets (51) Int. Cl.
*C01B 7/07* (2006.01)
*B01D 47/14* (2006.01)
*B01D 53/14* (2006.01)

(52) U.S. Cl.
CPC ..... *B01D 53/1431* (2013.01); *B01D 53/1456* (2013.01); *B01D 53/1493* (2013.01); *C01B 7/04* (2013.01); *C01B 7/0706* (2013.01); *C01B 7/0737* (2013.01); *C01B 7/0743* (2013.01); *B01D 2252/103* (2013.01); *B01J 2219/24* (2013.01); *Y02P 20/228* (2015.11)

(58) Field of Classification Search
CPC ....... C01B 7/07; C01B 7/0706; C01B 7/0731; C01B 7/0737; C01B 7/0743; B01D 47/00; B01D 47/14; B01D 53/00; B01D 53/14; B01D 53/1406; B01D 53/1431; B01D 53/1456; B01D 53/1493; B01D 2252/00; B01D 2252/10; B01D 2252/103; Y02P 20/00; Y02P 20/20; Y02P 20/22; Y02P 20/228
See application file for complete search history.

(56) References Cited

U.S. PATENT DOCUMENTS

| | | |
|---|---|---|
| 7,488,842 B2 | 2/2009 | Knoesche et al. |
| 7,615,662 B2 | 11/2009 | Pohl et al. |
| 7,718,145 B2 * | 5/2010 | Sasaki .................... B01D 53/18 422/105 |
| 8,153,838 B2 | 4/2012 | Bulan et al. |
| 8,288,584 B2 | 10/2012 | Knoesche et al. |
| 2004/0024244 A1 * | 2/2004 | Walsdorff .............. B01J 23/462 560/347 |
| 2007/0265466 A1 | 11/2007 | Dugal et al. |
| 2007/0269365 A1 | 11/2007 | Weber et al. |
| 2007/0276154 A1 | 11/2007 | Haas et al. |

FOREIGN PATENT DOCUMENTS

| | | |
|---|---|---|
| EP | 0 618 170 A1 | 10/1994 |
| EP | 1 318 101 A2 | 6/2003 |
| EP | 1 529 033 A1 | 5/2005 |
| EP | 1 743 882 A1 | 1/2007 |
| EP | 1 849 767 A1 | 10/2007 |
| EP | 1867631 A1 | 12/2007 |
| EP | 1 935 875 A1 | 6/2008 |
| EP | 2 468 387 A1 | 6/2012 |
| WO | WO-2004014845 A1 | 2/2004 |
| WO | WO-2005/123665 A1 | 12/2005 |
| WO | WO-2007/131638 A1 | 11/2007 |
| WO | WO-2007/131700 A1 | 11/2007 |
| WO | WO-2007/134774 A1 | 11/2007 |
| WO | WO-2009/037179 A1 | 3/2009 |

\* cited by examiner

METHOD FOR PROCESSING HYDROGEN CHLORIDE FROM ISOCYANATE PREPARATION

CROSS-REFERENCE TO RELATED APPLICATIONS

This application claims priority to European Application No. 14170116.9, filed May 27, 2014, which is incorporated herein by reference in its entirety.

The present invention relates to a method for processing hydrogen chloride from isocyanate preparation, comprising the steps: a) providing hydrogen chloride; b) purifying the hydrogen chloride provided; and furthermore comprising step c) or step d):
c) bringing the purified hydrogen chloride into contact with water and/or with hydrochloric acid which is not saturated with respect to uptake of hydrogen chloride
d) further processing the purified hydrogen chloride to chlorine by partial oxidation.

Hydrochloric acid is required, for example, as a process chemical in the semiconductor industry. Due to the interfering influence of impurities which act as doping agents, particular attention must be paid to the purity of the hydrochloric acid. This already applies to the hydrogen chloride which is employed for the preparation of the hydrochloric acid and can be obtained in large quantities from the preparation of isocyanates.

Various processes for treatment of the reaction mixture obtained in the preparation of isocyanates by phosgenation of amines are described in the prior art.

WO 2009/037179 A1 describes a process for the preparation of diisocyanates by reaction of the corresponding diamines with phosgene in a stoichiometric excess of phosgene in at least one reaction zone.

EP 1 935 875 A1 discloses a process for the preparation of isocyanates by reaction of corresponding primary amines with phosgene.

WO 2007/131700 A1 relates to a process for the preparation of isocyanates at least comprising the following steps: a) preparing phosgene by reaction of chlorine with carbon monoxide; b) reacting the phosgene formed according to step a) with at least one organic amine to form at least one isocyanate and hydrogen chloride; c) separating off and working up the isocyanates formed in step b); d) separating off the hydrogen chloride formed according to step b); e) oxidising the hydrogen chloride with oxygen in the gas phase to give chlorine; f) recycling at least a part of the chlorine prepared according to step e) into the preparation of phosgene according to step a), the oxidation e) being initiated by means of high-energy, in particular electron-stimulating and/or ionising radiation and/or a plasma-forming gas discharge and/or a plasma.

WO 2007/134774 A1 discloses a process for the preparation of organic isocyanates which comprises the steps: a) preparing phosgene by reaction of CO with $Cl_2$; b) reacting the phosgene with organic amines to form the organic isocyanates; c) separating off the organic isocyanates; d) separating off the carbon monoxide from the HCl-containing waste gas of the isocyanate synthesis by reaction with chlorine to form phosgene; e) separating off the phosgene formed; f) if appropriate recycling the phosgene formed into an isocyanate synthesis; and g) if appropriate subjecting the HCl-containing CO-depleted gas to HCl oxidation before or after the separating off e) of the phosgene.

WO 2007/131638 likewise describes a process for coupled preparation of isocyanates and chlorine.

EP 1 849 767 A1 discloses a process for the preparation of an isocyanate, wherein the process comprises a procedure in which: a) at least 1 amine is reacted with phosgene, optionally in the presence of a solvent, in order to produce a corresponding isocyanate and a stream comprising hydrogen chloride, phosgene and if appropriate solvent, low-boiling compounds and inert substances, b) the stream comprising hydrogen chloride, phosgene and if appropriate solvent, low-boiling compounds and inert substances is separated in an at least two-stage sequence of absorption stages comprising (1) at least 1 isothermal absorption stage and (2) at least 1 adiabatic absorption stage in order to obtain (i) a hydrogen chloride stream which comprises not more than 0.5 wt. %, based on the total weight of the hydrogen chloride stream, of phosgene and (ii) a liquid phosgene stream, and c) the liquid phosgene stream (ii) is recycled to stage a).

EP 1 743 882 A1 relates to a process for the preparation of isocyanates comprising the following steps: (a) preparing phosgene by reaction of chlorine with carbon monoxide; (b) reacting the phosgene formed according to step (a) with at least one organic amine to form at least one isocyanate and hydrogen chloride; (c) separating off and working up the isocyanates formed in step (b); (d) separating off and if appropriate purifying the hydrogen chloride formed according to step (b); (e) preparing an aqueous solution of the hydrogen chloride; (f) if appropriate purifying the aqueous solution of hydrogen chloride; (g) subjecting at least a part of the aqueous hydrogen chloride solution to electrochemical oxidation to give chlorine; (h) recycling at least a part of the chorine prepared according to step (g) into the preparation of phosgene according to step (a).

If appropriate, a purification of the hydrogen chloride is carried out according to step (d) in order to reduce the content of solvent. According to this patent application this can be carried out by means of freezing out, for example by passing the hydrogen chloride through one or more cold traps depending on the physical properties of the solvent. Alternatively, the purification of the hydrogen chloride provided if appropriate according to step (d) is carried out by means of adsorption of organic impurities, such as solvent residues, on active charcoal. In a further alternative, a distillation of the hydrogen chloride can be provided for the purification of the hydrogen chloride provided if appropriate according to step (d). This is carried out after condensation of the gaseous hydrogen chloride. In the distillation of the condensed hydrogen chloride, the purified hydrogen chloride is removed as the top product of the distillation, the distillation being carried out under the conventional conditions of pressure, temperature and the like for such a distillation which are known to the person skilled in the art.

If appropriate, the aqueous hydrogen chloride solution is subjected to a purification in a step (f) of this publication, in particular for further reduction of the solvent content and of the phosgene content. This can be effected by means of stripping in a column in a manner known to the person skilled in the art. e.g. by passing the concentrated hydrochloric acid into a packed column provided either with a circulating evaporator or with a steam feed. Instead of carrying out the stripping in a separate stripper column, it can also be carried out in the absorption column itself by direct feeding in of steam, preferably in the stripping part arranged under the absorption column. Instead of the stripping in the absorption column, the solvent content in the hydrogen chloride can also be reduced by partial distillation with the aid of a heat exchanger downstream of the absorption column.

The aqueous hydrogen chloride solution is moreover subjected to a purification to remove compounds of iron, aluminium and/or silicon in the step (f) which is provided if appropriate. Preferably, the removal of compounds of iron, aluminium and/or silicon is carried out by means of chelating ion exchangers. Such ion exchangers are commercially obtainable.

EP 1 867 631 relates to a system for the preparation of polyisocyanates in which the purification of HCl is likewise described.

EP 2 468 387 A1 describes a gas purification of phosgene by bringing into contact with a liquid. The purification of hydrogen chloride as a by-product is likewise mentioned.

WO 2005/123665 A1 relates to a process for the preparation of isocyanates by reaction of amines with phosgene in the gas phase in a reaction zone, wherein for discontinuation of the reaction the reaction mixture is led through a zone into which a liquid is injected, characterised in that between the reaction zone and the zone into which the liquid is injected the reaction mixture is led through a zone which has a reduced flow cross-section.

EP 0 618 170 A1 discloses a process for the preparation of aqueous hydrochloric acid having an iron content of less than 20 ppb, wherein the hydrochloric acid is brought into contact with a strongly basic anion exchanger.

EP 1 529 033 A1 likewise describes a process for the preparation of organic isocyanates, in which the hydrogen chloride obtained can be purified by means of absorption, adsorption, distillation or extraction. The possibility that for purification hydrogen chloride can be absorbed in water or dilute hydrochloric acid and desorbed later is also mentioned.

EP 1 318 101 A1 discloses a process for the preparation of substantially HBr-free HCl gas or substantially HBr-free aqueous HCl solution which has the following steps: a) providing HBr-containing HCl gas; b) passing the HBr-containing HCl gas through aqueous HCl solution saturated in HCl; c) separating off HBr-containing aqueous HCl solution saturated in HCl; d) if appropriate passing the substantially HBr-free HCl gas obtained in step b) into water to obtain substantially HBr-free aqueous HCl solution; wherein substantially HBr-free aqueous HCl solution produced if appropriate in step d) is led into step b) of the process.

In addition to the inorganic impurities mentioned in the prior art, such as HBr or iron, the HCl gas which originates from the isocyanate preparation can also contain organic impurities. As the inventors have found by their own preliminary experiments, removal thereof by adsorption, for example on active charcoal, is not possible in a satisfactory manner. Purification methods by distillation and extraction likewise were not satisfactory.

The object of the present invention was therefore to at least partly eliminate the disadvantages in the prior art. In particular its object was to provide a method for the purification of HCl gas with which organic and/or nitrogen-containing impurities can be separated off.

This object is achieved according to the invention by a method for processing hydrogen chloride from isocyanate preparation, comprising the steps:
a) providing hydrogen chloride
b) purifying the hydrogen chloride provided
and furthermore comprising step c) or step d):
c) bringing the purified hydrogen chloride into contact with water and/or with hydrochloric acid which is not saturated with respect to uptake of hydrogen chloride, it also being possible for stripping of solvents to take place in addition beforehand
d) further processing the purified hydrogen chloride to chlorine by partial oxidation wherein the hydrogen chloride provided in step a) contains organic and/or nitrogen-containing impurities and
wherein in step b) the purification is carried out by bringing hydrogen chloride into contact with hydrochloric acid which is saturated to the extent of ≥90% with respect to uptake of hydrogen chloride at least in a first gas scrubber and circulating this hydrochloric acid at least partially through the first gas scrubber.

It has been found that by circulating the concentrated hydrochloric acid in the first gas scrubber in particular organic and nitrogen-containing impurities which may be obtained in the isocyanate preparation can be removed from the hydrogen chloride. Preferably, the circulating of the hydrochloric acid is carried out in counter-current to the direction of flow of the hydrogen chloride.

In the hydrogen chloride provided according to step a) both organic impurities and nitrogen-containing impurities can be determined by means of catalytic oxidation with subsequent NDIR detection/DIN EN 12260, as is described below in the experimental part.

The analytical methods can also be used for determination of the further parameters of total carbon content (TC), total content of organic carbon (TOC) and total nitrogen content (TN) stated in the context of the present invention.

The fact that according to step a) the hydrogen chloride contains organic and/or nitrogen-containing impurities means in particular that they are detectable by the analytical methods mentioned.

As can be seen from the analysis instructions below in the experimental part, the abovementioned impurities and parameters are preferably determined via an analysis of the hydrochloric acid which is saturated to the extent of ≥90% with respect to uptake of hydrogen chloride and is employed for the purification.

In the context of the method according to the invention and of the system according to the invention which will be described later, the term "hydrochloric acid which is saturated to the extent of ≥90% with respect to uptake of hydrogen chloride" means that under the process conditions prevailing in step b), such as pressure, temperature etc., the hydrochloric acid has taken up and in particular dissolved ≥90% by weight of the theoretically possible amount of hydrogen chloride. Preferably, this value is ≥95% by weight and more preferably ≥99% by weight. The upper limit is of course ≤100% by weight, and particularly preferably the hydrochloric acid is saturated with respect to uptake of hydrogen chloride. In the method according to the invention, the hydrochloric acid employed for purification of the hydrogen chloride will as a rule very quickly become saturated by uptake of hydrogen chloride. If desired, however, the operator of the method can also feed the not completely saturated hydrochloric acid mentioned into the first gas scrubber.

According to step c) of the method according to the invention, the purified hydrogen chloride obtained can be used for the preparation of highly pure hydrochloric acid, such as is required, for example, in the electronics industry.

The alternative step d) of the method according to the invention provides a partial oxidation to chlorine, preferably according to the Deacon process. This chlorine gas can be recycled again to the preparation of phosgene and therefore to the phosgenation of amines.

Embodiments and further aspects of the present invention are explained in the following. They can be combined with one another as desired, if the opposite does not clearly emerge from the context.

In one embodiment of the method according to the invention, the first gas scrubber is configured as an absorption column. Preferably, the bringing into contact according to step b) is carried out isothermally here. For this, the first gas scrubber can be provided with a cooling device. It is furthermore preferable for the absorption column to contain packing or bulk material. This can be realised, for example, by Raschig rings having a diameter of between 1 mm and 20 mm. A pressure loss which is as low as possible is also aimed for in this way. For large-scale industrial uses the packing height can be 2 m to 5 m and preferably approx. 3 m. A liquid load of at least 10 m$^3$/m$^2$ h or at least 25 m$^3$/m$^2$ h can be established in the absorption column. The absorption column can furthermore have a demister at the top end.

In a further embodiment of the method according to the invention, the hydrogen chloride provided in step a) and to be purified in step b) has at least for a while a content of impurities, expressed as total nitrogen content (TN), of ≥15 ppm (preferably ≥30 ppm) and/or at least for a while a content of impurities, expressed as total content of organic carbon (TOC), of ≥15 ppm (preferably ≥30 ppm).

It is very particularly preferable here for the hydrogen chloride provided in step a) and to be purified in step b) to have at least for a while a content of impurities expressed as total nitrogen content (TN) of ≥15 ppm (preferably ≥30 ppm) and total content of organic carbon (TOC) of ≥15 ppm (preferably ≥30 ppm).

In a further embodiment of the method according to the invention, the hydrogen chloride provided in step a) and to be purified in step b) has a content of impurities, expressed as the ratio of total nitrogen content (TN) to total content of organic carbon (TOC), of from ≥1:2 to ≤2:1, preferably ≥0.9:1.1 to ≤1.1:0.9.

In a further embodiment of the method according to the invention, the hydrochloric acid obtained according to step c) has a content of impurities, expressed as total nitrogen content (TN), of ≤5 ppm (preferably ≤1 ppm) and/or a content of impurities, expressed as total content of organic carbon (TOC), of ≤5 ppm (preferably ≤1 ppm).

In a further embodiment of the method according to the invention, the hydrogen chloride provided in step a) and to be purified in step b) is obtained from the preparation of isocyanates by reaction of amines with phosgene. Examples of such amines are HAD (1,6-hexamethylenediamine), IPDA (isophoronediamine), XDA (xylylenediamine), PDA (1,2-propylenediamine), NDA (naphthylenediamine), MDA (methylenediphenyldiamine) and TDA (toluylenediamine). Aliphatic amines are preferred. Generally, it is also preferable for the hydrogen chloride to originate from the gas phase phosgenation of aliphatic amines.

In a further embodiment of the method according to the invention, step b) furthermore comprises:
purifying the hydrogen chloride obtained from the first gas scrubber by bringing this hydrogen chloride into contact with hydrochloric acid which is saturated to the extent of ≥90% with respect to uptake of hydrogen chloride in a second gas scrubber and circulating this hydrochloric acid at least partially through the second gas scrubber.

The twice-purified hydrogen chloride emerging from the second gas scrubber can then be transferred into step c) or step d) of the method according to the invention.

The second gas scrubber can have the same details and modes of operation as the first gas scrubber. To avoid unnecessary repetitions, they are not to be stated again. In particular, the second gas scrubber can also be an absorption column which has already been described previously and can be operated in counter-current to the hydrogen chloride stream.

The present invention also provides a system for processing hydrogen chloride from isocyanate preparation, comprising:
at least a first gas scrubber having a conveying device assigned to it, wherein the gas scrubber is set up to bring into contact with one another hydrogen chloride gas and hydrochloric acid which is saturated to the extent oft 90% with respect to uptake of hydrogen chloride, purified hydrogen chloride being obtained;
wherein the conveying device assigned to the particular gas scrubber is set up to allow hydrochloric acid which is saturated to the extent of ≥90% with respect to uptake of hydrogen chloride to circulate at least partially through the particular gas scrubber, this preferably being effected with cooling;
and an absorption column or an oxidation reactor, wherein
the absorption column is set up to bring hydrogen chloride removed from a gas scrubber of the system into contact with water and/or with hydrochloric acid which is not saturated with respect to uptake of hydrogen chloride;
the oxidation reactor is set up to convert hydrogen chloride removed from a gas scrubber into chlorine by partial oxidation, this preferably being effected after drying of the hydrogen chloride.

The hydrogen chloride can be further processed to hydrochloric acid in the absorption column. The oxidation reactor converts the hydrogen chloride, preferably by the Deacon process, into chlorine again, which can be reacted again to give phosgene.

In one embodiment of the system according to the invention, the hydrochloric acid which is saturated to the extent of ≥90% with respect to uptake of hydrogen chloride and the hydrogen chloride gas are led in counter-current to one another in the first gas scrubber. This can of course also be the case for a second gas scrubber.

In a further embodiment of the system according to the invention, the first gas scrubber is configured as a packed column. This can be realised, for example, by Raschig rings having a diameter of between 1 mm and 20 mm. A pressure loss which is as low as possible is also aimed for in this way. For large-scale industrial uses the packing height can be 2 m to 5 m and preferably approx. 3 m. A liquid load of at least 10 m$^3$/m$^2$ h or at least 25 m$^3$/m$^2$ h can be established in the absorption column. The column can furthermore have a demister at the top end. This can of course also be the case for a second gas scrubber.

In a further embodiment of the system according to the invention, a first hydrochloric acid tank is furthermore provided, in which hydrochloric acid which is saturated with respect to uptake of hydrogen chloride and which has passed through the first gas scrubber is collected and introduced on to the first gas scrubber again by means of the conveying device. Preferably, this is also effected with cooling. It is further preferable for contaminated hydrochloric acid to be able to be sluiced out of this hydrochloric acid tank and for this tank to be able to be topped up again with fresh hydrochloric acid and/or water, preferably hydrochloric acid. The stream sluiced out can comprise, for example, a maximum of 20% of the hydrochloric acid employed. This can of course also be the case for a second gas scrubber.

In a further embodiment of the system according to the invention, this furthermore comprises:

a second gas scrubber having a conveying device assigned to it, wherein the gas scrubber is set up to bring into contact with one another hydrogen chloride gas and hydrochloric acid which is saturated to the extent of ≥90% with respect to uptake of hydrogen chloride, purified hydrogen chloride being obtained;

wherein the conveying device assigned to the second gas scrubber is set up to allow hydrochloric acid which is saturated to the extent of ≥90% with respect to uptake of hydrogen chloride to circulate at least partially through the second gas scrubber, this preferably being effected with cooling;

wherein the system is set up to pass hydrogen chloride removed from the first gas scrubber into the second gas scrubber.

Cascading of the purification steps can be achieved in this manner. A cascade of more than two gas scrubbing steps of the type according to the invention is of course likewise possible.

The present invention is illustrated in more detail with reference to the following figures and examples, but without being fixed thereto. The figures show.

Figure 1:
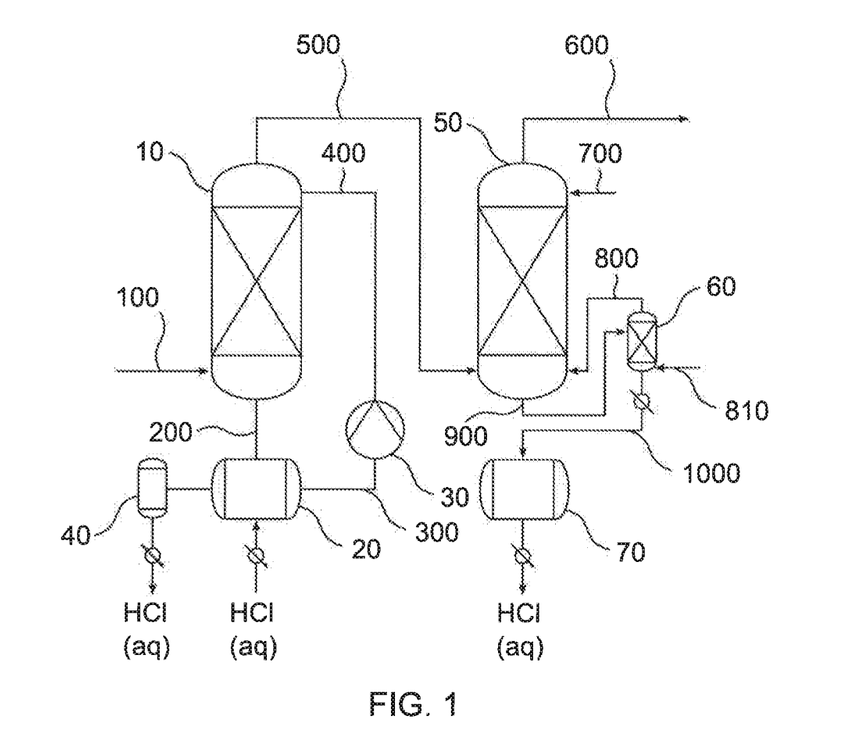
FIG. 1 diagram of an installation for carrying out the method according to the invention FIG. 2 diagram of a further installation for carrying out the method according to the invention FIG. 3 the accumulation of the components causing the TN and TOC in Example 1
Figure 2:
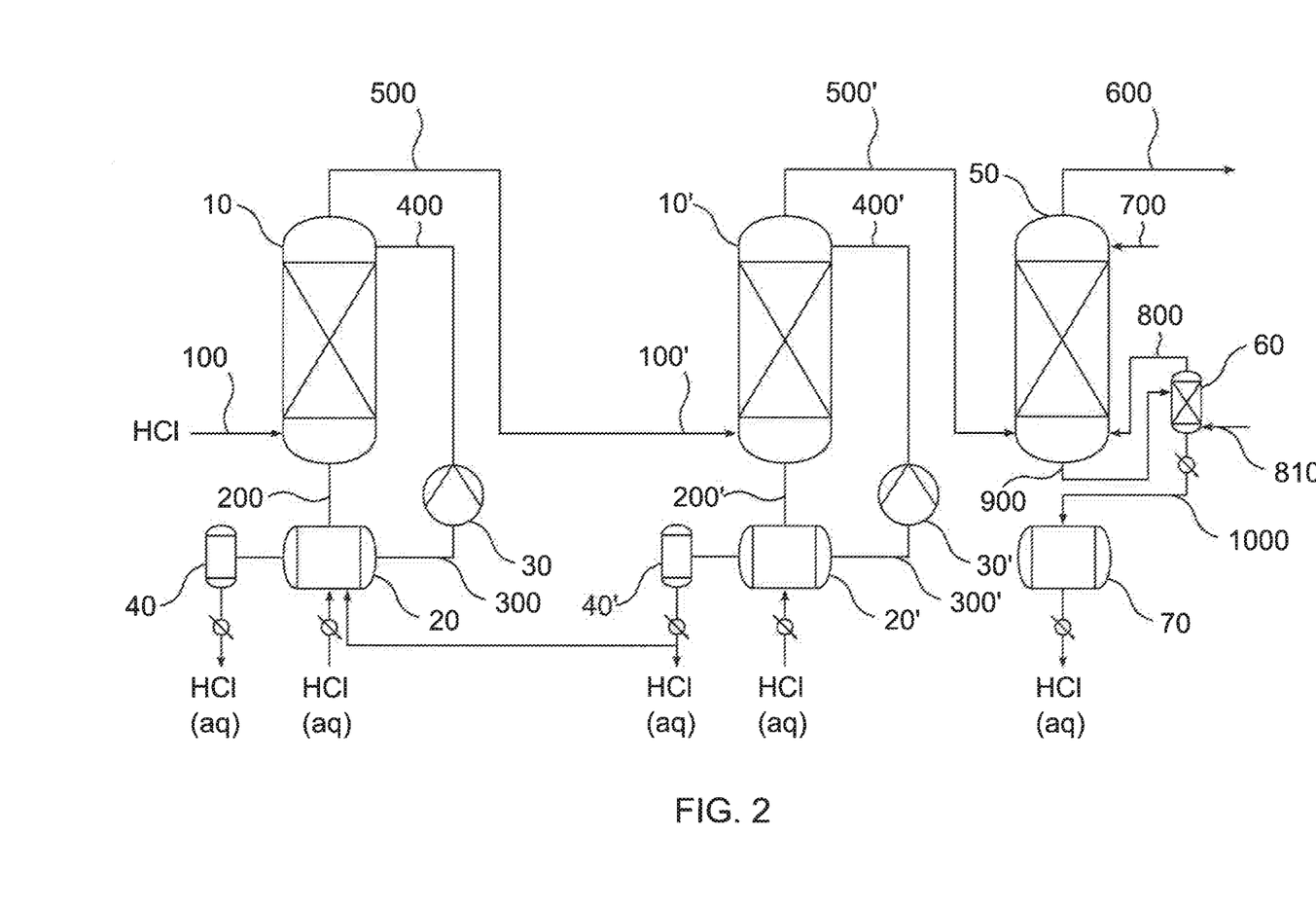

In FIG. 1 and FIG. 2 the designation "HCl (aq)" means hydrogen chloride gas dissolved in water, and therefore hydrochloric acid, without being limited to aqueous or dilute hydrochloric acid. This designation has been selected in order to be able to make a distinction from gaseous hydrogen chloride.

FIG. 1 shows a diagram of an installation for carrying out the method according to the invention. The first gas scrubber 10 here is configured as a packed column. Hydrogen chloride gas is introduced at the base of the column via substance stream 100. Concentrated hydrochloric acid is present in a first reservoir tank 20. This is saturated with respect to uptake of hydrogen chloride (or will become saturated in the course of the gas scrubbing in column 10 before it leaves the column). The hydrochloric acid from the first reservoir tank 20 enters into the pump 30 as substance stream 300 and downstream of the pump 30 is introduced at the top of the column 10 as substance stream 400.

After passing through the column 10, the concentrated hydrochloric acid leaves the gas scrubber 10 by means of substance stream 200. The hydrochloric acid collected in the first reservoir tank 20 can then be circulated again through the gas scrubber 10. During the gas scrubbing impurities become concentrated in the hydrochloric acid.

It is provided for hydrochloric acid which is correspondingly concentrated and contains impurities to be sluiced out of the second hydrochloric acid tank 40, which is connected to the first hydrochloric acid tank 20. To compensate the volume removed, the first hydrochloric acid tank 20 can furthermore be topped up with hydrochloric acid and/or water, preferably hydrochloric acid.

Purified hydrogen chloride gas is furthermore removed at the top of the first gas scrubber 10 by means of substance stream 500. This can then be used in a subsequent step for the preparation of hydrochloric acid having an increased purity. For this, the hydrogen chloride gas is passed into a column 50 in which it is brought into contact with water or with dilute hydrochloric acid, in each of the two cases by means of substance stream 700 at the top of the column. Waste gases can be fed to a disposal by means of substance stream 600 at the top of the column 50.

It is furthermore possible for the hydrochloric acid draining out of the column 50 to be led over a stripping column 60 with substance stream 900. Steam is passed through this column in counter-current (substance stream 810) in order to remove remaining volatile organic substances from the acid. The loaded steam stream 800 removed at the top of the column is led to the bottom of the absorption column 50. The purified hydrochloric acid stream 1000 draining out of the stripping column 60 is cooled and led into a reservoir container 70. From there the acid is fed to further processing.

FIG. 2 shows a diagram of a further installation for carrying out the method according to the invention. This figure shows how several gas scrubbing steps can be cascaded in order to be able to achieve an even higher purity of the hydrogen chloride gas. On the basis of the installation shown in FIG. One, which is not to be described again to avoid repetitions, a second purification installation is included downstream of the first gas scrubber 10, and receives prepurified hydrogen chloride gas from the first gas scrubber 10 by means of substance stream 100'.

The second gas scrubber 10' here is configured as a packed column. Hydrogen chloride gas is introduced at the base of the column via substance stream 100'. Concentrated hydrochloric acid is present in a second reservoir tank 20'. This is saturated with respect to uptake of hydrogen chloride (or will become saturated in the course of the gas scrubbing in column 10' before it leaves the column). The hydrochloric acid from the second reservoir tank 20' enters into the pump 30' as substance stream 300' and downstream of the pump 30' is introduced at the top of the column 10' as substance stream 400'.

After passing through the column 10' the concentrated hydrochloric acid leaves the gas scrubber 10' by means of substance stream 200'. The hydrochloric acid collected in the first reservoir tank 20' can then be circulated again through the gas scrubber 10'. During the gas scrubbing impurities become concentrated in the hydrochloric acid.

It is provided for hydrochloric acid which is correspondingly concentrated and contains impurities to be sluiced out of the second hydrochloric acid tank 40', which is connected to the first hydrochloric acid tank 20'. To compensate the volume removed, the first hydrochloric acid tank 20' can furthermore be topped up with hydrochloric acid and/or water, preferably hydrochloric acid.

Purified hydrogen chloride gas is furthermore removed at the top of the first gas scrubber 10' by means of substance stream 500'.

EXAMPLES

Analysis Instructions
1) Scope of Use:
  This method applies to hydrochloric acids
2) Basis:
  TOC apparatus with connected TN unit
  The abbreviation TOC stands for "total organic carbon", that is to say the total organic carbon content of a sample. In the case of hydrochloric acid, however, the TC (total carbon) content of the sample is determined. Nevertheless, in the context of the present invention the TOC content can be equated with the TC content since in particular in the phosgenation of amines no sources of inorganic or elemental carbon are present.

The total inorganic (IC), organic (TOC) and elemental carbon is generally oxidised to $CO_2$ (equation):

$$C_xH_x + n\ NaHCO_3 \xrightarrow{Al_2O_3/Pt/720°\ C.} (x+n)CO_2 + x\ H_2O + n\ NaOH$$

The $CO_2$ formed is transferred into an NDIR detector (non-dispersive infrared) by means of a carrier gas stream and is measured quantitatively there.

The TN value is understood as meaning the total nitrogen content of a sample. The method of combustion with subsequent chemoluminescence detection (CLD) is used for this. In this context, the sample is burned catalytically at 720° C. and nitrogen components are converted into NO:

$$4\ NH_3 + 5\ O_2 \xrightarrow{Cat.\ Ox./720°\ C.} 4\ NO + 6\ H_2O$$

The NO formed is reacted with ozone for the purpose of detection:

$$NO + O_3 \rightarrow NO_2^* + O_2$$

During this reaction light quanta are released (chemoluminescence), which are measured by the detector:

$$NO_2^* \xrightarrow{-h\nu} NO_2$$

3) Reagents:
   Millipore water is used as the water
4) Apparatuses:
4.1) Conventional Laboratory Apparatuses
4.2) TOC Apparatus with Connected TN Unit
5) Procedure:
   Introduce about 30 ml of Millipore water into a 100 ml volumetric flask and then pipette in 50 ml of the hydrochloric acid to be determined. After cooling to 20° C., fill the volumetric flask up to the mark with Millipore water.
   Measure the sample on the TOC apparatus with connected TN unit. If the dilution is set at 2, the total carbon and total nitrogen in mg/l are obtained as the result.
6) Calculation:
   The result is issued automatically by the apparatus as concentration by weight in mg/l.

Example 1

In a first example a scrubbing column comprising two glass columns ("scrubber 1" and "scrubber 2") of 50 mm diameter with 500 mm of bulk material (4 mm Raschig rings) connected in series was installed. Underneath both glass columns was a reservoir container for the scrubbing liquid having a volume of 5 l. The circulation for the scrubbing liquid was removed from this container and led in parallel to the two glass columns. A volume stream of HCl gas to be purified of from 190 to 250 l/h was led through the scrubbing column. The concentrations of TOC and TN impurities in the HCl gas to be purified were each in the range of from 44 to 71 mg/kg. The volume stream of the scrubbing liquid was 30 to 45 l/h, which corresponds to a liquid load of about 23 m³/m² h in the bulk material.

A second scrubber unit was installed downstream of this scrubbing column in order to obtain information on the impurities remaining in the HCl gas stream. This comprised a glass column of 50 mm diameter with 500 mm of bulk material (4 mm Raschig rings). Underneath this glass column was a reservoir container having a volume of 2 l, from which the circulation for the scrubbing liquid was removed and led on to the glass column. The same volume stream of HCl gas to be purified of from 190 to 250 l/h was led through this downstream scrubbing column. The volume stream of the scrubbing liquid was likewise 30 to 45 l/h, which corresponds to a liquid load of about 23 m³/m² h in the bulk material.

A constant accumulation of the impurities in the reservoir of the first scrubbing column was found as the result of this first example. These impurities could be concentrated up to a content of 2 g/l without a decrease in the scrubbing action being observed. In the downstream second scrubber unit of virtually identical construction, on the other hand, only small amounts of impurities were found.

Figure 3:
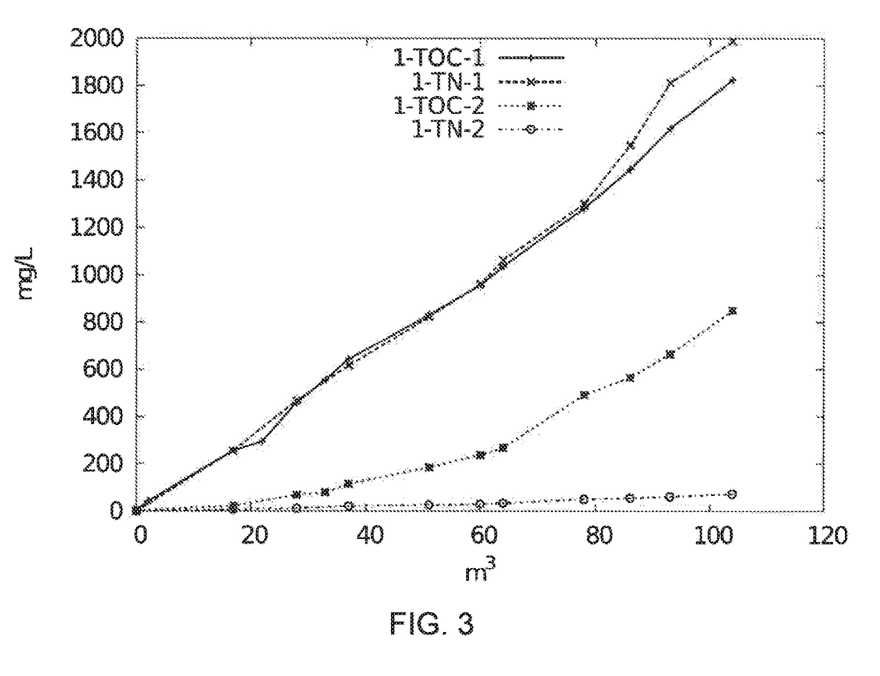

The following table, which is also shown as a graph in FIG. 3, shows the accumulation of the components causing the TN and TOC in the bottom containers of the first and second scrubbing column, plotted against the gas volume passed through, for Example 1. A separation efficiency for the TN impurities of at least 98.5% and for the TOC impurities of at least 86.2% was found as the result.

| Amount of gas passed through [m³] | Scrubber 1 TOC [mg/l] | Scrubber 1 TN [mg/l] | Scrubber 2 TOC [mg/l] | Scrubber 2 TN [mg/l] |
|---|---|---|---|---|
| 0 | 4.3 | 0.1 | 4.2 | 0.1 |
| 2.7 | 43 | | | |
| 17.6 | 257 | 257 | 23 | 8.9 |
| 22.9 | 294 | | | |
| 28.3 | 460 | 468 | 69 | 13 |
| 33.5 | 556 | | 80 | |
| 37.7 | 643 | 616 | 116 | 22 |
| 51.2 | 833 | 824 | 186 | 27 |
| 60.3 | 956 | 961 | 238 | 31 |
| 64.9 | 1036 | 1063 | 268 | 35 |
| 78.0 | 1281 | 1300 | 491 | 51 |
| 86.1 | 1446 | 1548 | 565 | 56 |
| 93.3 | 1618 | 1812 | 664 | 62 |
| 104.7 | 1825 | 1988 | 849 | 73 |

In FIG. 3 the reference symbols of the curves have the following meanings:
1-TOC-TOC content scrubber 1
1-TN-1 TN content scrubber 1
1-TOC-2 TOC content scrubber 2
1-TN-2 TN content scrubber 2

Example 2

In a second example a scrubbing column comprising two glass columns of 100 mm diameter with 500 mm of bulk material (12 mm Raschig rings) connected in series was installed. Underneath both glass columns was a reservoir container for the scrubbing liquid having a volume of 10 l. The circulation for the scrubbing liquid was removed from this container and led in parallel to the two glass columns. A volume stream of HCl gas to be purified of from 2,500 to 3,000 l/h was led through the scrubbing column. The concentrations of TOC and TN impurities in the HCl gas to be purified were each in the range of from 27 to 42 mg/kg. The volume stream of the scrubbing liquid was 150 to 200 l/h, which corresponds to a liquid load of about 26 m³/m² h in the bulk material. A drop separator was installed at the gas outlet of the first scrubber unit in order to avoid the discharge of loaded scrubbing liquid with the purified HCl gas stream.

A second scrubber unit was installed downstream of this scrubbing column in order to obtain information on the impurities remaining in the HCl gas stream. This comprised a glass column of 100 mm diameter with 500 mm of bulk material (12 mm Raschig rings). Underneath this glass column was a reservoir container having a volume of 5 l, from which the circulation for the scrubbing liquid was removed and led on to the glass column. The same volume stream of HCl gas to be purified of from 190 to 250 l/h was led through this downstream scrubbing column. The volume stream of the scrubbing liquid was likewise 30 to 45 l/h, which corresponds to a liquid load of about 23 m³/m² h in the bulk material.

An almost constant accumulation of the impurities in the reservoir of the first scrubbing column was likewise found as the result of this second configuration. These impurities could be concentrated up to a content of about 3 g/l without a decrease in the scrubbing action being observed. In the downstream second scrubber unit of virtually identical construction, on the other hand, only small amounts of impurities were found.

Figure 4:
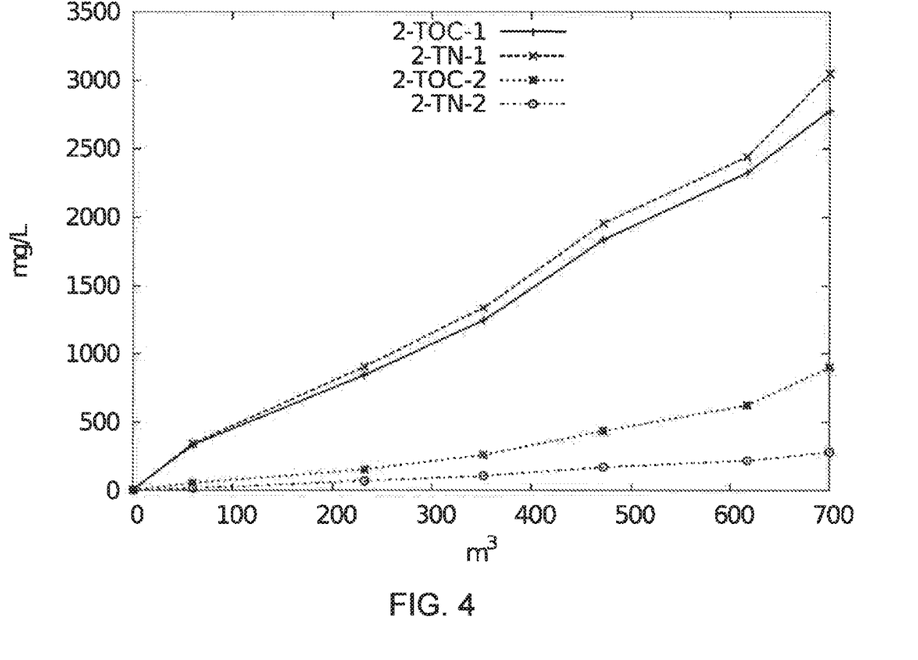
FIG. 4 the accumulation of the components causing the TN and TOC in Example 2

The following table, which is also shown as a graph in FIG. 4, shows the accumulation of the components causing the TN and TOC in the bottom containers of the first and second scrubbing column, plotted against the gas volume passed through, for Example 2. A separation efficiency for the TN impurities of at least 95.2% and for the TOC impurities of at least 84.8% was found as the result.

| Amount of gas passed through [m³] | Scrubber 1 | | Scrubber 2 | |
|---|---|---|---|---|
| | TOC [mg/l] | TN [mg/l] | TOC [mg/l] | TN [mg/l] |
| 0 | 9.7 | 5.3 | 9.7 | 5.3 |
| 60 | 334.6 | 343.2 | 57.7 | 19.2 |
| 232.5 | 845 | 906.3 | 156 | 72.1 |
| 352.5 | 1244.8 | 1338.9 | 262.9 | 109.6 |
| 472.5 | 1836 | 1956 | 437 | 172 |
| 617.5 | 1325.7 | 2443 | 624.7 | 220.3 |
| 700 | 2775.6 | 3052.8 | 901.1 | 281.3 |

In FIG. 4 the reference symbols of the curves have the following meanings:
2-TOC-1 TOC content scrubber 1
2-TN-1 TN content scrubber 1
2-TOC-2 TOC content scrubber 2
2-TN-2 TN content scrubber 2

Comparative Example

Adsorption experiments were likewise carried out as the closest method for purification of aqueous HCl to remove organic compounds. In this context the most diverse commercially available active charcoals having different pore structures, base materials and surface treatments were brought into contact with aqueous HCl containing TOC and TN impurities. These experiments were carried out as shaking experiments at room temperature over 3 days. Nevertheless, no purification effect with respect to the TN impurities and TOC impurities present was found, as the following table shows:

| Active charcoal used | Amount of active charcoal employed [g/l] | TOC impurity [mg/l] | TN impurity [mg/l] |
|---|---|---|---|
| Untreated HCl (blank sample) | — | 12 | 12 |
| Hydraffin CC 12 × 40 spezial | 10 | 12 | 12 |
| | 50 | 10 | 12 |
| Epibon X 12 × 40 spezial | 50 | 14 | 15 |
| | 50 | 11 | 12 |
| Filtrasorb 300 | 50 | 11 | 11 |
| CPG LF | 10 | 12 | 12 |
| | 50 | 11 | 12 |
| Aquacarb 207C 12 × 30 | 50 | 25 | 12 |
| Lewatit AF 5 | 10 | 12 | 12 |
| | 50 | 10 | 12 |

The invention claimed is:

1. A system for processing hydrogen chloride from isocyanate preparation, comprising:
at least a first gas scrubber having a first pump assigned to it, wherein the gas scrubber brings into contact hydrogen chloride gas and hydrochloric acid which is saturated to the extent of ≥90% with respect to uptake of hydrogen chloride;
wherein the first pump assigned to the particular gas scrubber allows hydrochloric acid which is saturated to the extent of ≥90% with respect to uptake of hydrogen chloride to circulate at least partially through the particular gas scrubber;
and an absorption column or an oxidation reactor, wherein the absorption column brings hydrogen chloride removed from a gas scrubber of the system into contact with water and/or with hydrochloric acid which is not saturated with respect to uptake of hydrogen chloride;
the oxidation reactor converts hydrogen chloride removed from a gas scrubber into chlorine by partial oxidation.

2. The system according to claim 1, wherein the hydrochloric acid which is saturated to the extent of ≥90% with respect to uptake of hydrogen chloride and the hydrogen chloride gas are led in counter-current to one another in the first gas scrubber.

3. The system according to claim 1, wherein the first gas scrubber is configured as a packed column.

4. The system according to claim 1, wherein a first hydrochloric acid tank is furthermore provided, in which hydrochloric acid which is saturated with respect to uptake of hydrogen chloride and which has passed through the first gas scrubber is collected and introduced on to the first gas scrubber again by means of the first pump.

5. The system according to claim 1, further comprising:
a second gas scrubber having a second pump assigned to it, wherein the gas scrubber brings into contact hydrogen chloride gas and hydrochloric acid which is saturated to the extent of ≥90% with respect to uptake of hydrogen chloride;
wherein the second pump assigned to the second gas scrubber allows hydrochloric acid which is saturated to the extent of ≥90% with respect to uptake of hydrogen chloride to circulate at least partially through the second gas scrubber;
wherein the system passes hydrogen chloride removed from the first gas scrubber into the second gas scrubber.

* * * * *